United States Patent
Dutch et al.

(10) Patent No.: US 9,424,139 B1
(45) Date of Patent: Aug. 23, 2016

(54) VERSION BASED DATA PROTECTION

(75) Inventors: Michael John Dutch, Saratoga, CA (US); Christopher Hercules Claudatos, San Jose, CA (US); Mandavilli Navneeth Rao, Santa Clara, CA (US)

(73) Assignee: EMC Corporation, Hopkinton, MA (US)

( * ) Notice: Subject to any disclaimer, the term of this patent is extended or adjusted under 35 U.S.C. 154(b) by 81 days.

(21) Appl. No.: 13/077,743

(22) Filed: Mar. 31, 2011

(51) Int. Cl.
*G06F 7/00* (2006.01)
*G06F 17/30* (2006.01)
*G06F 11/14* (2006.01)

(52) U.S. Cl.
CPC ....... *G06F 11/1464* (2013.01); *G06F 11/1451* (2013.01); *G06F 11/1458* (2013.01)

(58) Field of Classification Search
CPC ........... G06F 11/1451; G06F 11/1458; G06F 11/1464
See application file for complete search history.

(56) References Cited

U.S. PATENT DOCUMENTS

| | | | | |
|---|---|---|---|---|
| 4,821,228 | A * | 4/1989 | Wickes et al. | 708/530 |
| 6,527,812 | B1 * | 3/2003 | Bradstreet | G06F 9/4443 715/210 |
| 6,697,822 | B1 | 2/2004 | Armatis et al. | |
| 6,959,369 | B1 * | 10/2005 | Ashton et al. | 711/162 |
| 7,620,633 | B1 * | 11/2009 | Parsons et al. | |
| 7,793,146 | B1 * | 9/2010 | Gibson | G06F 11/1076 711/114 |
| 7,822,726 | B1 * | 10/2010 | Cardin | G06F 11/1435 707/702 |
| 8,170,997 | B2 * | 5/2012 | Lomet et al. | 707/683 |
| 8,244,716 | B2 * | 8/2012 | Becker et al. | 707/716 |
| 2002/0049883 | A1 | 4/2002 | Schneider et al. | |
| 2003/0131253 | A1 | 7/2003 | Martin et al. | |
| 2005/0080914 | A1 | 4/2005 | Lerner et al. | |
| 2005/0144189 | A1 | 6/2005 | Edwards | |
| 2005/0197860 | A1 * | 9/2005 | Joffe | G06Q 50/22 705/2 |
| 2005/0223018 | A1 * | 10/2005 | Forin et al. | 707/100 |
| 2006/0225070 | A1 | 10/2006 | Childress et al. | |
| 2007/0094312 | A1 * | 4/2007 | Sim-Tang | 707/204 |
| 2007/0180122 | A1 * | 8/2007 | Barrett | H04L 67/14 709/227 |
| 2008/0195891 | A1 | 8/2008 | Jang | |
| 2008/0229142 | A1 | 9/2008 | Anand et al. | |
| 2008/0256138 | A1 * | 10/2008 | Sim-Tang | 707/202 |
| 2009/0083056 | A1 * | 3/2009 | Gole et al. | 705/1 |
| 2009/0164994 | A1 | 6/2009 | Vasilevsky et al. | |
| 2009/0313227 | A1 * | 12/2009 | Dunning et al. | 707/3 |
| 2009/0313309 | A1 * | 12/2009 | Becker et al. | 707/203 |
| 2010/0010913 | A1 | 1/2010 | Pinckney et al. | |
| 2010/0138778 | A1 | 6/2010 | Dewan et al. | |
| 2010/0312754 | A1 | 12/2010 | Bear et al. | |
| 2011/0035727 | A1 * | 2/2011 | Mohamed | 717/110 |
| 2011/0167047 | A1 | 7/2011 | Arata | |
| 2012/0109895 | A1 * | 5/2012 | Zwilling et al. | 707/648 |
| 2012/0246563 | A1 | 9/2012 | Nusbaum | |
| 2013/0080420 | A1 * | 3/2013 | Taylor et al. | 707/722 |
| 2013/0155882 | A1 * | 6/2013 | Pendleton | H04L 43/0882 370/252 |
| 2013/0232196 | A1 * | 9/2013 | Berry | H04L 67/14 709/203 |

\* cited by examiner

*Primary Examiner* — Loan T Nguyen
(74) *Attorney, Agent, or Firm* — Theodore A. Chen; Krishnendu Gupta

(57) ABSTRACT

A method, article of manufacture, and apparatus for recovering data. In some embodiments, this includes creating a version of the data set, determining a metadata window based on the created version, storing metadata based on the determined metadata window in a first storage device, and storing the version in a second storage device. In some embodiments, a metadata tag may be associated with the metadata, and in some embodiments, a version tag may be associated with the version.

12 Claims, 5 Drawing Sheets

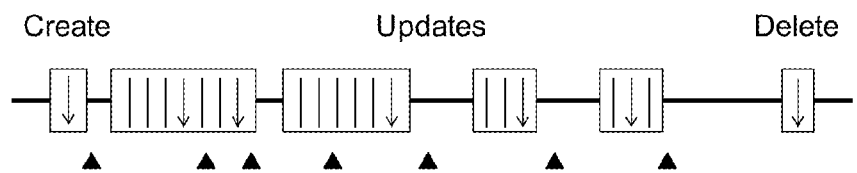
FIG. 1
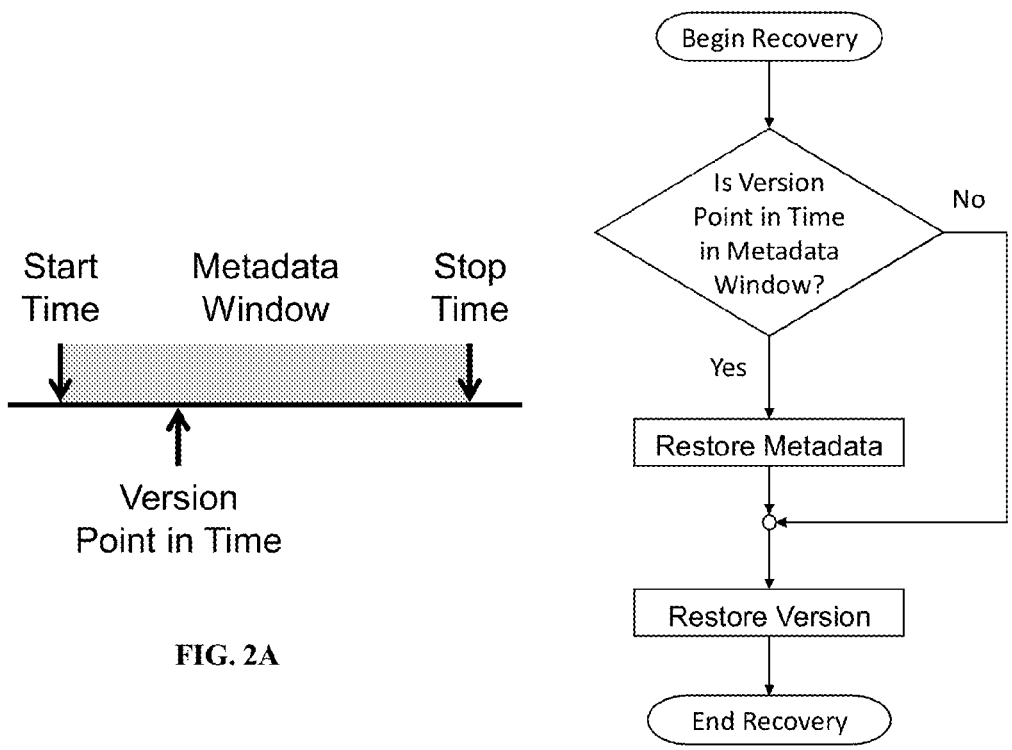
FIG. 2A
FIG. 2B

VERSION BASED DATA PROTECTION

CROSS REFERENCE TO RELATED APPLICATIONS

This application is related to co-pending U.S. patent application Ser. No. 13/077,764 for UNDO REDO RECOVERY and filed concurrently herewith, which is incorporated herein by reference for all purposes, and to co-pending U.S. patent application Ser. No. 13/077,780 for AGGREGATE UNDO REDO and filed concurrently herewith, which is incorporated herein by reference for all purposes.

FIELD OF THE INVENTION

This invention relates generally to processing data, and more particularly to systems and methods for protecting data.

BACKGROUND OF THE INVENTION

Conventional methods of protecting data include backing up a copy of the data to a remote location. More elaborate methods also allow for policies to be set on the backup, such as when to backup, how often to backup, compressing the backup, deduplicating the backup, how to deduplicate the backup, encrypting the backup, scanning the backup for viruses, and allocating different backup resources to different backup clients, among others.

However, these elaborate methods consume an ever-increasing amount of attention and resources from data protection administrators. As conventional data protection methods are further refined to include more options and more procedures, data protection administrators find themselves overloaded with products that were designed to simplify their work.

There is a need, therefore, for an improved method, article of manufacture, and apparatus for protecting data.

BRIEF DESCRIPTION OF THE DRAWINGS

The present invention will be readily understood by the following detailed description in conjunction with the accompanying drawings, wherein like reference numerals designate like structural elements, and in which:

FIG. 1 is a diagram of a life cycle of a data set in accordance with some embodiments.

FIG. 2A is a diagram of a metadata window and version in accordance with some embodiments.

FIG. 2B is a flowchart of a method to recover data in accordance with some embodiments

DETAILED DESCRIPTION

Figure 3:
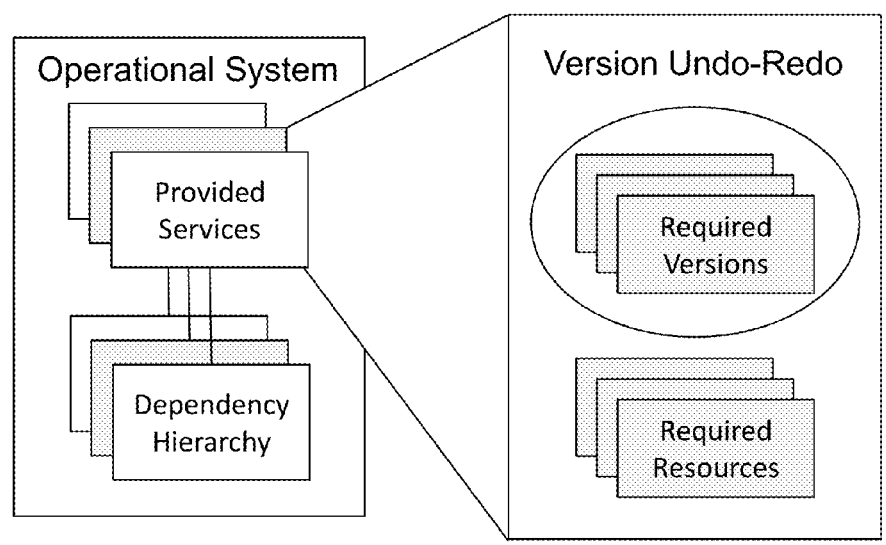
FIG. 3 is a diagram of multiple data sets in accordance with some embodiments.

A detailed description of one or more embodiments of the invention is provided below along with accompanying figures that illustrate the principles of the invention. While the invention is described in conjunction with such embodiment(s), it should be understood that the invention is not limited to any one embodiment. On the contrary, the scope of the invention is limited only by the claims and the invention encompasses numerous alternatives, modifications, and equivalents. For the purpose of example, numerous specific details are set forth in the following description in order to provide a thorough understanding of the present invention. These details are provided for the purpose of example, and the present invention may be practiced according to the claims without some or all of these specific details. For the purpose of clarity, technical material that is known in the technical fields related to the invention has not been described in detail so that the present invention is not unnecessarily obscured.

It should be appreciated that the present invention can be implemented in numerous ways, including as a process, an apparatus, a system, a device, a method, or a computer readable medium such as a computer readable storage medium or a computer network wherein computer program instructions are sent over optical or electronic communication links. Applications may take the form of software executing on a general purpose computer or be hardwired or hard coded in hardware. In this specification, these implementations, or any other form that the invention may take, may be referred to as techniques. In general, the order of the steps of disclosed processes may be altered within the scope of the invention.

An embodiment of the invention will be described with reference to a data storage system in the form of a storage system configured to store files, but it should be understood that the principles of the invention are not limited to this configuration. Rather, they are applicable to any system capable of storing and handling various types of objects, in analog, digital, or other form. Although terms such as document, file, object, etc. may be used by way of example, the principles of the invention are not limited to any particular form of representing and storing data or other information; rather, they are equally applicable to any object capable of representing information.

What users are really after when they perform a restore operation is a prior version of their data. For example, when a user recovers a system image, the user may want only a previous version of system files (in case of virus infection or system file corruption), the previous state of "My Documents" (prior version may have an important word document the user accidentally deleted), or a previous version of a financial document (prior version may have the correct values). In all these cases, what the user wants can be characterized as an "undo."

Undo has typically been viewed as a user's intention to recover a past state of an application. For example, if a user is working in Microsoft Word, and accidentally deletes a paragraph, the user may hit "undo" (e.g. CTRL+Z) to undo the delete. Similarly, redo has typically been viewed as a user's intention to recover a state of an application that was removed by undo. Following the above example, if the user decided that the paragraph actually should be deleted, the user may hit "redo" (e.g. CTRL+Y) to redo the delete.

The enhanced techniques described herein use "undo-redo" as a general recovery paradigm. FIG. 1 illustrates the life of a data set in accordance with some embodiments. In the first rectangle, the data set is created. The arrow enclosed indicates that a change has been committed (e.g. a save). The first triangle indicates that a backup was taken. This may be referred to as a version. The second, third, fourth, and fifth rectangles indicate respective sessions. For example, if the data set was a word document, a session would be the time between when Word opened the data set, and when Word closed the data set. The vertical lines in each session indicate changes. Following the word example, these vertical lines may indicate additions by the user, or deletions by the user. As indicated by the various vertical lines and arrows in the sessions, many changes took place during each session. Some changes were committed (e.g. saved), while some changes were not (e.g. fifth session did not commit last change). The sixth box indicates that the data set was deleted, and the change was committed.

As shown in FIG. 1, several versions of the data set were taken. The first version was taken after creation, the second version was taken during second session, the third version was taken at the end of the second session, the fourth version was taken during the third session, the fifth version was taken between the fourth and fifth sessions (but not during any session), and so on.

Figure 4:
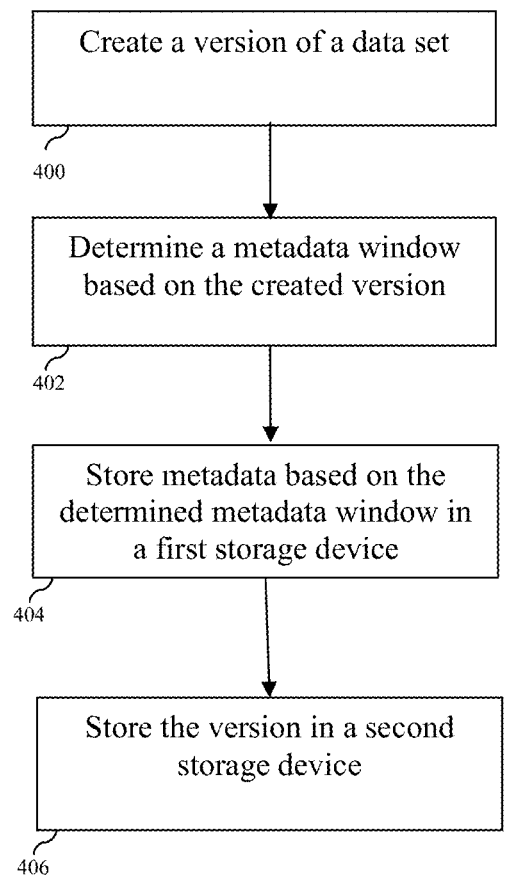
FIG. 4 is a flowchart of a method to protect data in accordance with some embodiments.

FIG. 4 illustrates a method to protect data in accordance with some embodiments. In step 400, a version of a data set is created. In step 402, a metadata window is determined based on the created version. In step 404, metadata is stored based on the determined metadata window in a first storage device. In step 406, the version is stored in a second storage device.

After deletion has occurred, a user may return to a previous state of the data set. In some embodiments, a recovery interface may be used to allow a user to view and select previous versions. For example, a user may hit a "BACK" button to view the data set at its most recent version. In some embodiments, a user may be given the option of seeing a list of versions and selecting a version to return to. In some embodiments, the user may be able use the interface to search for specific versions according to some criteria. It should be noted that multiple versions may have the same data. For example, if a user deleted all the text at each arrow in FIG. 1 (e.g. each commit), in some embodiments, versions 5, 6, and 7 would have the same data (e.g. an empty word document). This process may be referred to as version undo-redo.

In some embodiments, a version may be saved along with the metadata of the application. For example, if a version is taken during a session (e.g. Word is open when a backup is taken), Word's metadata may be saved and associated with the version to allow for application undo-redo that users are familiar with (e.g. CTRL Z, CTRL Y). Metadata may include the identity of the user making the changes, where the user is making the changes from (e.g. IP address, etc.), along with the state of the application, among others.

Traditionally, application undo-redo was limited to one session. For example, if a user opened Word, made some changes without saving, closed Word, and then opened Word again, the user would be unable to "undo" to Word's previous changes. However, using the enhanced techniques described herein, if a version was created during a session, saving metadata needed to implement undo-redo for that session allows undo-redo to persist across multiple sessions by recovering such metadata when a version is recovered. Following the example in FIG. 1, if metadata for the second session is recovered when the second version is recovered, the undo-redo operations associated with the second session may also be resumed.

In some embodiments, metadata needed to perform undo-redo operations in a session may be saved with the start and stop times of the session. When a version within this timeframe is recovered, the associated metadata is also recovered. This is illustrated in FIGS. 2A and 2B. As illustrated in FIG. 2A, a version is taken between a start time and stop time of a session (e.g. metadata window). As illustrated in FIG. 2B, since the version is taken between during a metadata window, the metadata and the version are restored. It should be noted that "metadata" need not be restricted to files. In some embodiments, metadata may include programs.

Version undo-redo and session undo-redo complement each other to form a seamless user experience. Thus, in some embodiments, when a user performs an undo operation to a version, and the version was taken during a session, the user may perform undo-redos throughout the session. Further, if the user is at the beginning of a session and performs an undo operation, the user will be taken to the next available version. If the next available version also was taken during a session, the user may perform undo-redos throughout that session. From a user's point of view, it will seem like the user is able to undo-redo throughout the lifecycle of the data set.

Figure 5:
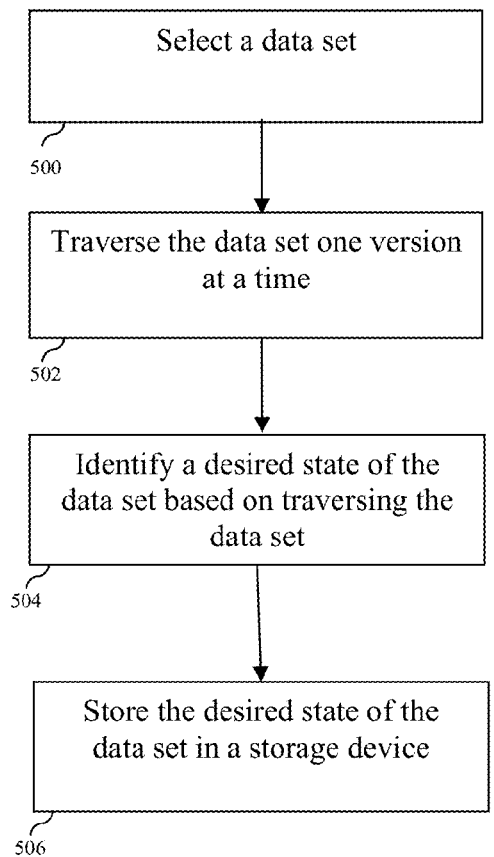
FIG. 5 is a flowchart of a method to recover data in accordance with some embodiments.

FIG. 5 illustrates a method to recover data in accordance with some embodiments. In step 500, a data set is selected. In step 502, the data set is traversed one version at a time. In step 504, a desired state of the data set is identified based on traversing the data set. In step 506, the desired state of the data set is stored in a storage device. In some embodiments, traversing one version at a time may include undo-ing to a previous version. For example, if a user started at the third version of the data set's life cycle, undo-ing to a previous version would mean recovering the second version of the data set's life. Similarly, redo-ing to an after version would mean recovering the fourth version of the data set's life.

In some embodiments, it may be preferable to save a sessions's metadata at the close of the session. For example, as shown in FIG. 1, the fifth session ends without committing the last change. Upon the close of the fifth session, it may be preferable to store all of the metadata of the session to allow for undo-redo operations. Thus, even if the "saved" version of the file only contains changes up to the arrow (commit) in the fifth session, restoring to the seventh version will allow an undo to the last change in the fifth session.

Even though a version may coincide with a metadata window timeframe, it may be desirable to not recover the metadata along with the timeframe. For example, an author of a word document may be given permission to access all of the sessions during the word document's life cycle, but an auditor may only be given permission to access versions. A wide variety of policies may be used to determine when metadata should be restored, and when metadata should not.

In some embodiments, after metadata has been created, a set of tags may be associated with the metadata. Similarly, after a version has been created, another set of tags may be associated with the version. The metadata and metadata tags, and the version and version tags may be saved independently from each other and from the application. When a version is recovered, metadata will also be recovered if the metadata tags "match" the version tags. When the tags "match," it means that any algorithm or policy that processes the tags returns a "true" if the metadata is to be recovered. For example, metadata may represent security settings and metadata/version tags may represent lifecycle stages. Metadata recovery may be used to recover the security settings as they existed when a version was created by comparing the respective tags.

Some applications, such as text editors described above, may require recovery of only a single file or other data object. However, some applications may require recovery of multiple files or data objects to effectuate an undo. Examples include databases, where a transaction undo may require changes in many files throughout the database. Recovery of multiple data objects may be performed by coordinating multiple undo-redo operations. This coordination is particularly important when recovering composite applications (aggregations of cooperating components, potentially running on multiple operating systems and platform types) to ensure application consistency.

In some embodiments, multiple undo-redos may be aggregated into one aggregated undo-redo. Aggregated undo-redo may be used to extend the simplicy of undo-redo to higher abstraction levels by automating and hiding the use of multiple version undo-redo operations.

FIG. 3 illustrates a method to accomplish aggregate undo-redo in accordance with some embodiments. The left outer rectangle represents an operational system which provides a set of services to its consumers, indicated by the left top inner rectangles. Each of these services is associated with a hierarchy of dependencies, as illustrated by the line connecting the inner rectangles. The hierarchy of dependencies specifies which services and resources are required to provide a service, and the order they should be restored in. Sub-branches of the hierarchy tree indicate which services and resources can be restored independently of each other.

Shaded elements represent work items. In FIG. 3, only one of the services provided by the operational system requires undo-redo. Its dependency hierarchy indicates that this service requires a specific set of versions to be recovered (those within the oval) as well as a specific set of other resources (e.g., IP addresses, processing requirements, and other services). If another service is required, the method is applied recursively.

Figure 6:
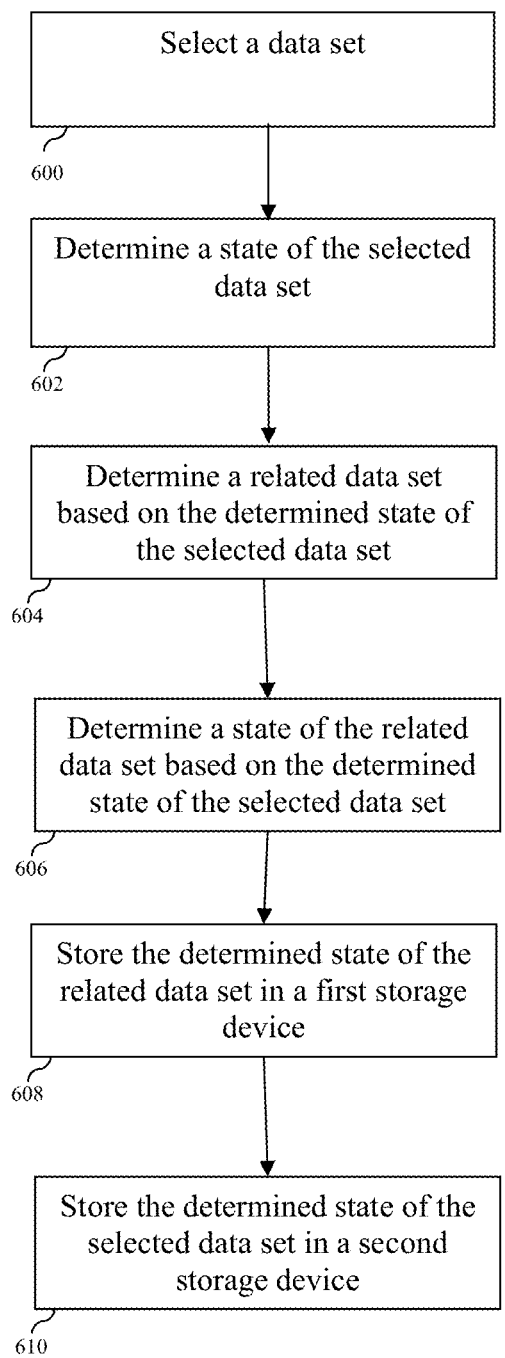
FIG. 6 is a flowchart of a method to recover data in accordance with some embodiments.

FIG. 6 illustrates a method to recover data in accordance with some embodiments. In step 600, a data set is selected. In step 602, a state of the selected data set is determined. In step 604, a related data set is determined based on the determined state of the selected data set. In step 606, a state of the related data set is determined based on the determined state of the selected data set. In step 608, the state of the related data set is stored in a first storage device. In step 610, the state of the selected data set is stored in a second storage device. In some embodiments, the order of what state of a data set to recover is based on the hierarchies of the data sets.

In some embodiments, it may be preferable to designate a location for where to perform the undo-redo operation. Conventional undo-redos perform the operation where the application or data was located. The enhanced techniques described herein allow for users to specify a location for an undo-redo operation.

Undo@ may mean the current version or application is to be moved to the specified location. Redo@ means the current version or application s to be copied to the specified location. For example, suppose a virtual data center is to be migrated to another location. If the operational system exposing the notion of a virtual data center includes undo@ and redo@ capability, the intent to move or copy its services to another location can be expressed with a consistent model.

It should be noted that the enhanced undo-redo capabilities described herein need not be separate from the application. The enhanced techniques described herein may be implemented as part of the application, as part of the operating system, or as a stand-alone product.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor.

All references cited herein are intended to be incorporated by reference. Although the present invention has been described above in terms of specific embodiments, it is anticipated that alterations and modifications to this invention will no doubt become apparent to those skilled in the art and may be practiced within the scope and equivalents of the appended claims. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device. The disclosed embodiments are illustrative and not restrictive, and the invention is not to be limited to the details given herein. There are many alternative ways of implementing the invention. It is therefore intended that the disclosure and following claims be interpreted as covering all such alterations and modifications as fall within the true spirit and scope of the invention.

What is claimed is:

1. A method for protecting a data set, the method comprising:
    creating a first version of the data set;
    determining a first metadata window based on the first version of the data set wherein the first metadata window includes a start time and a stop time associated with a session of sequential alterations of the data set;
    storing a first set of metadata based on the determined first metadata window in a first storage device wherein the first set of metadata contains at least undo-redo data associated with the first metadata window, and wherein storing the first set of metadata includes retaining the stored the first set of metadata after the session terminates;
    storing the first version in a second storage device;
    creating a second version of the data set;
    determining a second metadata window based on the second version of the data set wherein the second metadata window includes a start time and a stop time associated with a session of sequential alterations of the data set;
    storing a second set of metadata based on the determined second metadata window in the first storage device wherein the second set of metadata contains at least undo-redo data associated with the second metadata window, and wherein storing the second set of metadata includes retaining the stored the second set of metadata after the session terminates; and
    storing the second version in a third storage device.

2. The method as recited in claim 1, further comprising associating a version tag with the version.

3. The method as recited in claim 2, further comprising associating a metadata tag with the metadata.

4. The method as recited in claim 1, wherein the first storage device and the second storage device are the same storage device.

5. A system for protecting a data set, comprising a first storage device, a second storage device, and a processor configured to:
  create a first version of the data set;
  determine a first metadata window based on the first version of the data set wherein the first metadata window includes a start time and a stop time associated with a session of sequential alterations of the data set;
  store a first set of metadata based on the determined first metadata window in the first storage device wherein the first set of metadata contains at least undo-redo data associated with the first metadata window, and wherein store the first set of metadata includes retaining the stored the first set of metadata after the session terminates;
  store the first version in the second storage device;
  create a second version of the data set;
  determine a second metadata window based on the second version of the data set wherein the second metadata window includes a start time and a stop time associated with a session of sequential alterations of the data set;
  store a second set of metadata based on the determined second metadata window in the first storage device wherein the second set of metadata contains at least undo-redo data associated with the second metadata window, and wherein storing the second set of metadata includes retaining the stored the second set of metadata after the session terminates; and
  store the second version in a third storage device.

6. A non-transitory computer program product for protecting a data set, comprising a computer readable medium having program instructions embodied therein for:
  creating a first version of the data set;
  determining a first metadata window based on the first version of the data set wherein the first metadata window includes a start time and a stop time associated with a session of sequential alterations of the data set;
  storing a first set metadata based on the determined first metadata window in a first storage device wherein the first set of metadata contains at least undo-redo data associated with the first metadata window, and wherein storing the first set of metadata includes retaining the stored the first set of metadata after the session terminates;
  storing the first version in a second storage device;
  creating a second version of the data set;
  determining a second metadata window based on the second version of the data set wherein the second metadata window includes a start time and a stop time associated with a session of sequential alterations of the data set;
  storing a second set of metadata based on the determined second metadata window in the first storage device wherein the second set of metadata contains at least undo-redo data associated with the second metadata window, and wherein storing the second set of metadata includes retaining the stored the second set of metadata after the session terminates; and
  storing the second version in a third storage device.

7. The method of claim 1, wherein the third storage device and the second storage device are the same storage device.

8. The method of claim 1, wherein the first metadata window and the second metadata window are the same metadata window.

9. The method of claim 6, wherein a version time associated with the first version of the data set is after the start time of the first metadata window and prior to the stop time of the first metadata window.

10. The method of claim 1, further comprising:
  determining application specific metadata associated with the first version of the dataset wherein the storing metadata in the first storage device includes storing the application specific metadata.

11. The method of claim 10, wherein the application specific metadata includes application shortcut keys for at least one of undo or redo.

12. The method of claim 1, wherein storing metadata includes storing programs.

* * * * *